(12) United States Patent
Reshef (10) Patent No.: US 9,237,544 B2
(45) Date of Patent: Jan. 12, 2016

(54) METHODS AND ARRANGEMENTS TO COMMUNICATE ENVIRONMENTAL INFORMATION FOR LOCALIZATION

(71) Applicant: Intel Corporation, Santa Clara, CA (US)

(72) Inventor: Ehud Reshef, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 13/631,853

(22) Filed: Sep. 28, 2012

(65) Prior Publication Data

US 2014/0094189 A1 Apr. 3, 2014

(51) Int. Cl.
*H04W 24/00* (2009.01)
*H04W 64/00* (2009.01)
(Continued)

(52) U.S. Cl.
CPC .............. *H04W 64/00* (2013.01); *H04L 67/18* (2013.01); *G01S 5/0027* (2013.01); *G01S 5/0252* (2013.01)

(58) Field of Classification Search
CPC . H04W 64/00; H04W 64/003; H04W 64/006; H04W 4/027; H04W 4/021; H04W 4/026; H04W 4/02; H04W 4/26; H04W 36/32; H04W 48/02; H04W 84/005; H04W 52/0251; H04L 67/12; H04L 67/18; H04L 63/08; H04N 21/25841; H04M 15/723; H04M 15/8033; H04M 1/72569; H04M 2250/12
USPC .......... 455/456.1, 456.2, 456.5, 456.6, 456.3, 455/404.2, 405, 407, 419, 446, 456.4
See application file for complete search history.

(56) References Cited

U.S. PATENT DOCUMENTS

2004/0229631 A1* 11/2004 George ............... 455/456.1
2006/0142935 A1 6/2006 Koerber
(Continued)

FOREIGN PATENT DOCUMENTS

| WO | 2010/106530 A2 | 9/2010 |
| WO | 2011/144967 A1 | 11/2011 |
| WO | 2014/051819 A1 | 4/2014 |

OTHER PUBLICATIONS

International Search Report and Written Opinion received for Patent Application No. PCT/US2013/048807, mailed on Oct. 22, 2013, 12 pages.
(Continued)

*Primary Examiner* — Khai M Nguyen
(74) *Attorney, Agent, or Firm* — Schubert Law Group PLLC (57) ABSTRACT

Embodiments may comprise logic to adaptively prepare and transmit environmental information based upon an estimated current location and, in some embodiments, context of a device and to adaptively cache the environmental information to reduce or optimize environmental information communicated from an information server to the device. Some embodiments comprise an information server to receive a request for environmental information comprising an estimated current location for the device. In many embodiments, the information server may determine a prior set of environmental information conveyed to the device and determine, in response to receiving the estimated current location, the current set of environmental information based upon the estimated current location. In many embodiments, the current set of environmental information may encompass environmental information near the estimated current location of the device but not to encompass environmental information that was included in a prior set of environmental information transmitted to the device.

30 Claims, 5 Drawing Sheets (51) Int. Cl.
*H04L 29/08* (2006.01)
*G01S 5/00* (2006.01)
*G01S 5/02* (2010.01)

(56) References Cited

U.S. PATENT DOCUMENTS

| | | |
|---|---|---|
| 2007/0021126 A1 | 1/2007 | Nanda et al. |
| 2010/0211425 A1* | 8/2010 | Govindarajan .................. 705/8 |
| 2011/0302116 A1* | 12/2011 | Ide et al. ......................... 706/12 |
| 2012/0046822 A1* | 2/2012 | Anderson .................... 701/29.1 |
| 2012/0083286 A1 | 4/2012 | Kim et al. |
| 2012/0142369 A1* | 6/2012 | Hodges ...................... 455/456.1 |
| 2013/0315144 A1* | 11/2013 | Karaoguz et al. ............. 370/328 |
| 2014/0018106 A1* | 1/2014 | Fulger et al. ............... 455/456.3 |
| 2014/0122040 A1* | 5/2014 | Marti ................................ 703/6 |
| 2014/0152494 A1* | 6/2014 | MacGougan et al. ... 342/357.39 |

OTHER PUBLICATIONS

International Preliminary Report on Patentability and Written Opinion received for PCT/US2013/048807, mailed on Mar. 31, 2015, 7 pages.

* cited by examiner

METHODS AND ARRANGEMENTS TO COMMUNICATE ENVIRONMENTAL INFORMATION FOR LOCALIZATION

BACKGROUND

The present disclosure relates generally to the field of wireless communications technologies. More particularly, the present disclosure relates to adaptively communicate environmental information for localization.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Generally, embodiments to communicate environmental information supporting localization are described herein. Embodiments may comprise logic such as hardware and/or code to adaptively prepare and transmit environmental information based upon an estimated current location and, in some embodiments, context of a device and to adaptively cache the environmental information to reduce or optimize environmental information communicated from an information server to the device. Some embodiments comprise an information server to receive a request for environmental information comprising an estimated current location for a device. In many of these embodiments, the information server may determine a prior set of environmental information conveyed to the device and determine, in response to receiving the estimated current location, a subset of delta environmental information, or current set of environmental information, to convey to the device based upon information received in the request and a prior set of environmental information conveyed to the device in a prior communication. In some embodiments, determining a subset of delta environmental information to convey to the device may involve determining a geographical area for which to determine environmental information based upon the estimated current location. In some embodiments, the geographical area may be designed to encompass environmental information near the estimated current location of the device but not to encompass environmental information that was included in a prior set of environmental information transmitted to the device. In many embodiments, the shape, size, and other aspects of the geographical area may vary between communications of the sets of environmental information. In some embodiments, the geographical area may be determined based upon the estimated current location, information in the request, a geographical area for which environmental information is available, and/or other related or unrelated factors.

In other embodiments, the geographical area may overlap a geographical area of a prior set of environmental information transmitted to the device. In such embodiments, the information server may determine environmental information to create a current set of environmental information other than the environmental information in a prior set transmitted to the device. In further embodiments, environmental information in a prior set transmitted to the device may be removed from the set of environmental information gathered for the current geographical area prior to transmitting the current set of environmental information to the device.

Other embodiments may generate and transmit a request to an information server to obtain environmental information. Such embodiments may generate a request comprising an estimated current location to request a current set of environmental information. In some embodiments, the request may also provide context such as an indication that the device that requests the information comprises a prior set of environmental information and/or that the device may use the prior set of environmental information. Several embodiments may generate a request that indicates a direction of movement of the device and/or a speed of movement of the device. Further embodiments may request a current set of environmental information along a particular or planned route.

In many embodiments, the device may comprise an Ultrabook, a Tablet, and a Smartphone to facilitate Contextual Aware Computing. Location awareness is an important aspect of Contextual Aware Computing. Location awareness refers to devices' ability to determine or estimate their location in many or all locations, including outdoors and multiple different indoor venues.

In contrast to an outdoors location, which can be derived, in many situations, by using Global Navigation Satellite based Systems (GNSS), these signals do not easily penetrate into the indoors environment, so different methods may be implemented while the GNSS based systems are not available.

Embodiments may implement one or more different approaches for determining the location of the device without using the GNSS system or by using the last known location of the GNSS system along with a method for determining a location based upon environmental information. Environmental information can comprise any information that can be processed by the embodiment against known environmental information to determine an estimated location. For instance, an embodiment may determine an estimated location by measuring wireless signals such as those emanated from Cellular towers, Wi-Fi access points or fixed stations, light sources having fixed positions, etc. Further embodiments may utilize other fixed, predictable signals, structures, patterns, etc. Some embodiments may utilize other anchors to determine an estimated location such as other mobile or portable devices that either provide (with good reliability) their location or provide their location through a server.

Many embodiments may utilize one or more of methods such as triangulation or multilateration, fingerprinting, and/or the like. Triangulation or multilateration may involve estimating the distance to the various transmitters (e.g. by measuring the received signal strength, and computing the path loss based on known or assumed transmit power) and estimating the position best matching the set of estimated distances from known transmitters. Triangulation or multilateration may be received signal strength indicator (RSSI) based. Many wireless communications devices may measure the energy of a radio signal to determine an RSSI. Other methods of estimating a location may involve time-based measurements or may involve time-based measurements in addition to other types of measurements. Time based measurements may comprise, e.g., time of flight, time of arrival, round trip delay time, angle ascent or descent such as the angle of arrival, etc. Note that the accuracy of the location may depend on the accuracy with which the locations of the various transmitters are known as well as the accuracy of the distance measurements. Some embodiments may utilize transmitters that advertise their location. Further embodiments may additionally or alternatively set-up a database of transmitters' locations or access a database of transmitters' locations.

Fingerprinting may rely on correlating the measured environment (RF, light, or any other signal) to a pre-computed environmental map. In this case the exact location of the various transmitters is not important, however the positioning accuracy relates to the granularity of the grid of the environmental map as well as to temporal changes in the measured signal characteristics.

Embodiments may maintain such environmental information, whether it relates to transmitters' locations or to an environmental (e.g. RF) map, on an information server. Information servers may be local servers for a venue, regional servers, state or national servers, global servers, or the like. As the overall database size may be prohibitive, it is of value to convey just the relevant set of environmental information to the device to support its positioning efforts. While one approach may reduce the data-set size conveyed to the device by partitioning the entire world into geographical areas (examples can be a fixed or variable grid, a specific venue, etc.), and sending to the device, the environmental information of the grid element that is relevant to its current location, embodiments may reduce or optimize data presented to the device by conveying subsets of environmental data compiled for the estimated current location of the device rather than transferring the content of a grid element. For instance, many embodiments may determine a geographical area about the estimated current location, such as a circle, oval, or polygon, and transfer the environmental information for that geographical area. In some embodiments, the geographical area may be determined based upon the availability of sources for environmental information or at least sources compatible with the particular device that requests the environmental information.

Many embodiments may determine the geographical area to optimize the amount of environmental information transferred to the device based not only on the estimated current location but also on context. For instance, the device may be a cell phone or laptop and the user may intend to remain within a certain radius or area so the geographical area may be determined based upon the radius. The geographical area may be selected to be in front of the device if the device is moving in a particular direction and/or the size of the geographical area may be determined based upon a speed of movement by the device.

In further embodiments, the geographical area may be designed to exclude an area for which the device has previously received environmental data or the information server may remove or otherwise exclude the environmental data that has already been transmitted to the device.

Various embodiments may be designed to address different technical problems associated with communication of environmental information. For instance, some embodiments may be designed to address one or more technical problems related to communicating environmental information. The technical problem of communicating environmental data may involve problems arising from transmitting repetitive or overlapping sets of environmental information or by generally communicating more environmental information to the device than the device requires to determine or estimate the location of the device.

Technical problems such as one or more of the technical problems discussed above have not been known in the art until discovery and teaching represented by this disclosure. A lack of understanding of technical problems led to the failure of current art to conceive of, discuss, and describe the solutions such as the solutions described by this disclosure. In other words, the solutions presented herein were not obvious in the art due at least in part to a lack of knowledge of the technical problems by other persons of skill in the art.

Different technical problems such as those discussed above may be addressed by one or more different embodiments. For instance, some embodiments that are designed to address excessive amounts of environmental information conveyed to a device may do so by one or more different technical means such as generating a set of environmental information based upon the estimated current location of the device, the direction of movement of the device, the speed of movement of the device, and/or the planned route of the device.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs), stations (STAs), routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and localization services. Further embodiments may utilize anchor devices such as routers, switches, servers, workstations, netbooks, mobile devices (Laptop, Smart Phone, Tablet, and the like), as well as sensors, meters, controls, instruments, monitors, appliances, and the like to estimate a current location based upon a relative location of such anchor devices.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like WiGig, Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ dual antennas or other multiple antennas. For instance, multiple-input and multiple-output (MIMO) is the use of radio channels carrying signals via multiple antennas at both the transmitter and receiver to improve communication performance. Further embodiments may implement directional antennas or antenna arrays.

While some of the specific embodiments described below will reference the embodiments with specific configurations, those of skill in the art will realize that embodiments of the present disclosure may advantageously be implemented with other configurations with similar issues or problems. For instance, embodiments below refer to medium access control (MAC) and physical (PHY) layers for preparing data for transmission and transmitting the data. However, any method or process by which a device may communicate with an information server to request and then to receive environmental data falls within the scope of this disclosure. Thus, the reference to the MAC and PHY layers are for illustrative purposes to explain how the embodiments may operate at these particular types of systems. Persons of ordinary skill in the art will be enabled by this disclosure to make and use other systems such as an application layer protocol such as secure user plane location platform (SUPL), a transport layer such as Transmission Control Protocol/Internet Protocol (TCP/IP), as well as others.

Figure 1:
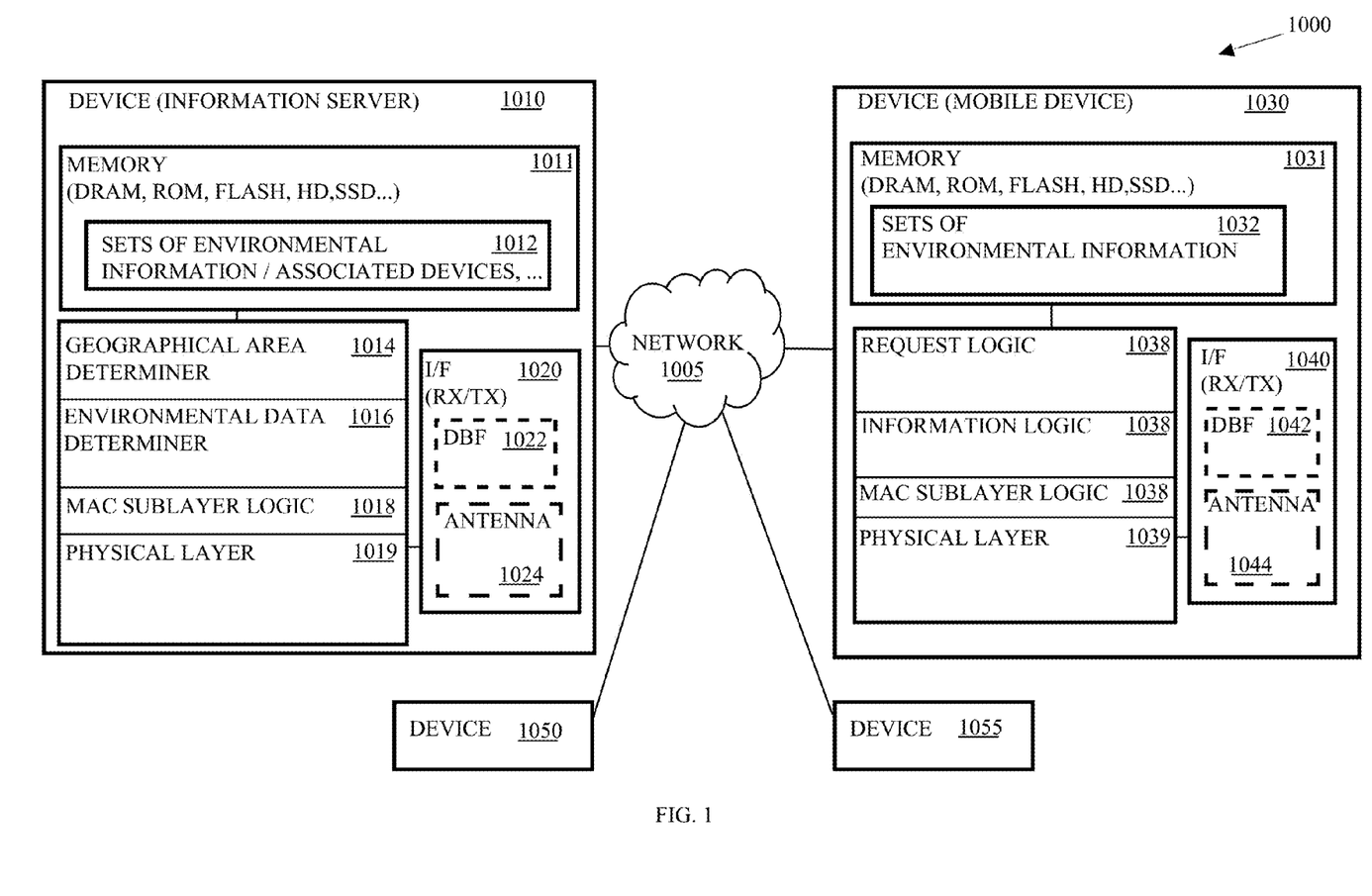
FIG. 1 depicts an embodiment of a wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that may be wire line and/or wirelessly connected to a network 1005. The communications device 1010 may communicate with a plurality of communication devices 1030, 1050, and 1055 via the network 1005. The communications device 1010 may comprise an information server that provides environmental information to communication devices such as communications device 1030 to support localization. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. For example, the communications device 1010 may comprise a server coupled with the communications device 1030 such as a cellular phone via a Wi-Fi access point of network 1005 such as device 1055. The communications device 1030 may reside in a venue such as an amusement park and the user may desire to know the location of the communications device 1030 so the user can determine the user's location within the amusement park with respect to certain rides and entertainment programs.

Figure 1A:
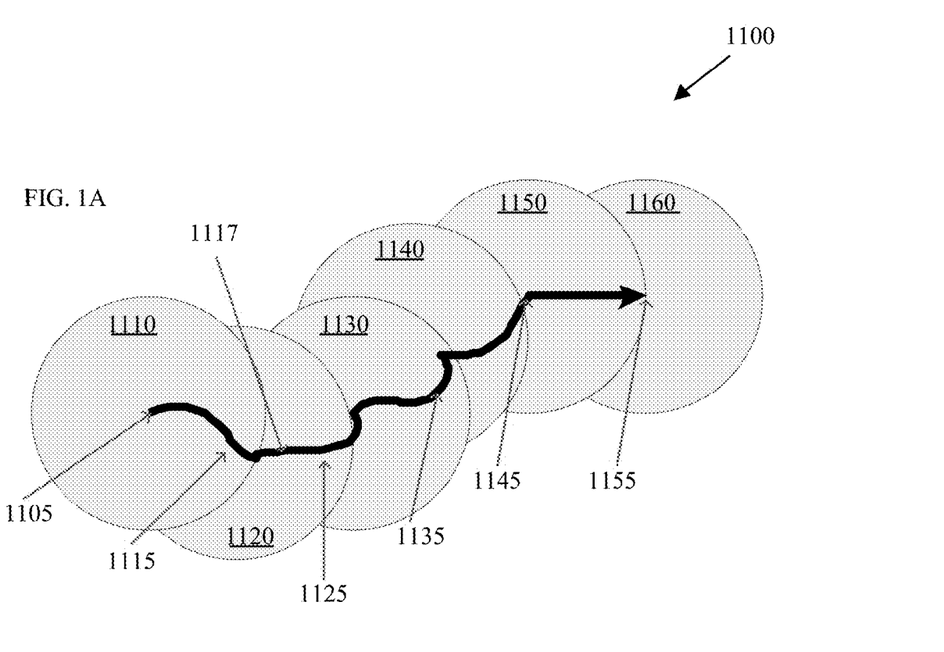
FIG. 1A depicts an embodiment of a route taken by a communications device and communication of geographical area based environmental information communicated to the device during the route.

Initially, the communications device 1030 may receive a first set of environmental information for a geographical area such as a circle 1110 in FIG. 1A while at a first location 1105. FIG. 1A illustrates an embodiment 1100 of geographical areas 1110, 1120, 1130, 1140, 1150, and 1160 as well as a path illustrated by an arrow between locations 1105, 1115, 1125, 1135, 1145, and 1155. The arrow may represent the path of the user as the user traverses through the amusement park and the circle 1110 and crescents 1120, 1130, 1140, 1150, and 1160, may represent the geographical areas of downloads of sets of environmental information from the communications device 1010 to the communications device 1030.

The communications device 1030 may comprise request logic 1038 to determine when to request environmental information and generate the request for the environmental information. In the present embodiment, the request logic 1038 may determine when to request additional environmental information based upon reaching a route constraint or after moving a certain distance from the last request for environmental information. For instance, the communications device 1030 may initially request the environmental information based upon absolute coordinates, coordinates relative to a point at the entrance of the amusement park, or data indicative of absolute and/or relative coordinates of location 1105. The communications device 1030 may periodically, or intermittently, estimate a current location utilizing a set of environmental information maintained in memory local or at least accessible to the communications device 1030 to determine if the communications device 1030 has reached a route constraint or a certain distance from the last location at which the communications device 1030 received the set of environmental information from the communications device 1010. Once the communications device 1030 determines that the route constraint has been reached or a distance from a prior location of a download of environmental information has been reached, the communications device 1030 may generate a request to send to the communications device 1010 to initiate a download of another set of environmental information.

The communications device 1010 may determine a subset of delta environmental information, referred to as a current set of environmental information, to send to the communications device 1030 in response to the request. In some embodiments, communications device 1010 may determine the current set of environmental information by determining a geographical area about or near the estimated location of the communications device 1030 provided in the request. In some embodiments, rather than directly defining a particular geographical area, the geographical area may be defined inherently based upon a limit on the amount of environmental information that will be transmitted to the communications device 1030. For instance, the communications device 1010 or the communications device 1030 may set a limit on the amount of environmental information that the current set of environmental information may comprise for the purposes of, e.g., limiting the amount of bandwidth used to communicate the current set of environmental information, limiting the amount of data that the communications device 1030 stores to maintain the environmental information, or any other reason. Upon determining environmental information in the vicinity of the communications device 1030 that reaches the limitation on the data transfer, the communications device 1010 may stop gathering environmental information to include in the current set of environmental information.

In several embodiments, the communications device 1010 may comprise a geographical area determiner 1014 to determine an area for which to provide environmental information. The geographical area determiner 1014 may determine the geographical area directly or may determine the geographical area inherently based upon a process for gathering environmental information and constraints related to including environmental information in the current set of environmental information. The geographical area may be of any size or shape and may be generic or generated based upon context related to the requesting device, the area about the estimated current location of the communications device 1030, environmental information available in the vicinity of the communications device 1030, or any other factor.

In the present embodiment, the communications device 1010 may be managed by the amusement park and, based upon heuristically determined data, the geographical area determiner 1014 may select a circle having a given radius as the geographical area. In other embodiments, the communications device 1010 may be an information server for a larger area or region such as a global information server. In some embodiments, the size of the geographical area may vary based upon, e.g., the speed with which the communications device 1030 moves from a location of a download of environmental information to a route constraint such as the initial location of 1105 to the route constraint at location 1115, from location 1115 to route constraint 1125, from location 1125 to route constraint 1135, and the like. In further embodiments, the size of the geographical area may not vary in size or may also vary in shape. For instance, the shape of the geographical area may vary with the locations within the amusement park. To illustrate, communications device 1010 may vary the geographical area when the user moves from an outdoor location to an indoor location for various reasons including, for example, that the indoor facility may block environmental information from outside of the indoor facility.

In many embodiments, the geographical area determiner 1014 may exclude a geographical area of a prior set of environmental information transmitted to the communications device 1030. For example, the geographical area determiner 1014 may store an indication of the area covered by the prior set of environmental information in memory 1011, or an indication of the prior set of environmental information transmitted to the communications device 1030 in memory 1012. In other embodiments, the request logic 1038 may provide an indication of the prior set of environmental information in the request generated at location 1115. In such embodiments, the geographical area determiner 1014 may remove the overlap of the geographical area determined from location 1115 and the geographical area determined for location 1105.

In other embodiments, the geographical area determiner 1011 may simply determine a geographical area without considering the geographical area of the prior set of environmental data. In such embodiments, the environmental data determiner 1016, which determines a current set of environmental information based upon the current geographical area, may remove the repetitive environmental information between the current set of environmental information and the prior set of environmental information. In further embodiments, the communications device 1010 may store indications of the geographical areas or the sets of environmental information for more than one of the transmissions to the communications device 1030, depending upon the amount of environmental information the communications device 1030 is expected to maintain or based upon the number of prior sets of environmental information that the communications device 1030 indicates that it is maintaining in a request for environmental information.

By taking into consideration one or more prior sets of environmental information transmitted to the communications device 1030 or the geographical areas thereof, the communications device 1010 can reduce or optimize the amounts of data, and therefore, the amount of bandwidth required to provide the environmental information to the communications device 1030.

After receiving the current set of environmental information from the communications device 1010 representing the geographical area 1120, the information logic 1038 of communications device 1030 may access one or more prior sets of environmental information 1032 or portions thereof from memory 1031, store the current set of environmental information in memory 1031, and combine the relevant portion of the prior set(s) of environmental information with the current set of environmental information to determine a subsequent location of the communications device 1030 such as the location 1135.

Figure 1B:
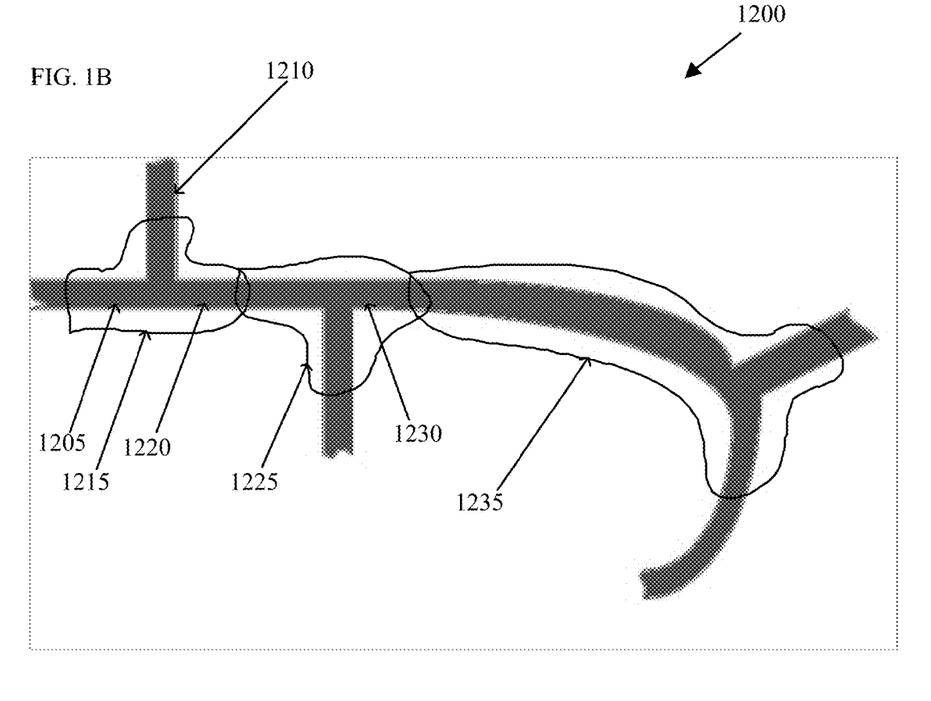
FIG. 1B depicts an alternative embodiment of a route taken by a communications device and communication of geographical area based environmental information communicated to the device during the route.

Referring now to FIG. 1B, there is shown an alternative embodiment 1200 of a route of a communications device, geographical areas 1215, 1225, and 1235, as well as alternate paths 1205, 1220, and 1230 along a route. In some embodiments, the route may be relatively constrained or the majority of users may follow one or more particular branches so the communications device 1010 may generate geographical areas along the route. In further embodiments, the route may be planned or the communications device 1010 may receive a route from the communications device 1030 or from a navigation route server that is providing the route to the communications device 1030 or otherwise to the user of the communications device 1030. In response to receiving the route, and in some embodiments, potential alternative routes, the geographical area determiner 1014 may generate geographical areas tailored for the route such as geographical areas 1215, 1225, and 1235.

In the present embodiment, the geographical areas include not only the primary route from location 1205 through location 1230 but also potential branches from the route including the branch 1210 illustrated in area 1215 and the branches in areas 1225 and 1235. The communications device 1010 may initially determine a first set of environmental information for area 1215 and then subsequent sets of environmental information for areas 1225 and 1235. The geographical area 1225 may overlap the geographical area 1215 and the environmental data determiner 1016 may exclude environmental information that was included in the first set of environmental information for the geographical area 1215 from the second set of environmental information for the geographical area 1225. Similarly, the area 1235 may overlap area 1225 and the environmental data determiner 1016 may exclude repetitive data between the second set of environmental information and the third set of environmental information unless the communications device 1030 generates a request for the third set of environmental information indicating that the complete set should be transmitted. This latter situation may occur, for instance, if the user or the communications device 1030 determines that the information in the second set of environmental information is too old or otherwise not reliable.

The communications device 1030 may transmit the request via a data link layer and physical layer of communications device 1030. For instance, a frame builder 1033 of communications device 1030 may generate or select a frame based upon a frame structure in memory 1031 of communications device 1030. The medium access control (MAC) sublayer logic 1038 may communicate with the physical layer (PHY) 1039 to transmit the frame to the PHY 1039 of communications device 1030.

In response, medium access control (MAC) sublayer logic 1018 of communications device 1010 may determine a current set of environmental information and transmit the current set of environmental information to the communications device 1030 via a data link layer and physical layer of communications device 1010. The data link layers and physical layers of communications devices 1010 and 1030 may be designed for wireless communications in accordance with one or more protocols such as Wi-Fi protocols, cellular data protocols, Bluetooth, near field communication, or the like. The particular protocol may depend upon the protocols available to the communications devices 1010, 1030, and 1050. In other embodiments, the communications device 1030 may communicate directly with communications device 1010. In still other embodiments, the communications device 1050 is wired to communications device 1010 such that the only wireless communications are between communications devices 1050 and 1030.

Upon receiving the current set of environmental, the MAC sublayer logic 1038 of the communications device 1030 may parse and interpret the frame based upon a structure for the frame to determine the current set of environmental information and then store the current set in memory 1031.

The network 1005 may represent an interconnection of a number of networks. For instance, the network 1005 may couple with a wide area network such as the Internet, an intranet, a cellular network, and/or a cellular data network, and may interconnect devices, wired or wirelessly, via one or more hubs, routers, or switches. In the present embodiment, network 1005 communicatively couples communications devices 1010, 1030, 1050, and 1055.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the sets of environmental information, representations of environmental information, and/or geographical areas associated with communications of sets of environmental information to the communications device 1030. Furthermore, the memory 1011 may store similar data for each device or for some of the devices for which communications device 1010 determines and transmits sets of environmental information.

The MAC sublayer logic 1018, 1038 may comprise logic to implement functionality of the MAC sublayer of the data link layer of the communications device 1010, 1030. The MAC sublayer logic 1018, 1038 may generate frames such as management frames, data frames, and control frames, and may communicate with the PHY 1019, 1039 to transmit the frames. The PHY 1019, 1039 may generate physical layer protocol data units (PPDUs) based upon the frames. More specifically, the frame builders 1013 and 1033 may generate the frames 1014, 1034 and data unit builders of the PHY 1019, 1039 may encapsulate the frames 1014, 1034 with preambles to generate PPDUs for transmission via physical layer devices such as the network interfaces (I/Fs) 1020 and 1040.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In some embodiments, the communications device 1010 optionally comprises a Digital Beam Former (DBF) 1022, as indicated by the dashed lines. The DBF 1022 transforms information signals into signals to be applied to elements of an antenna 1024. In the present embodiment, the antenna 1024 may be an antenna array comprising antenna elements.

Other embodiments may comprise single, dual, or other number of antennas. The antenna 1024 is an array of individual, separately excitable antenna elements. The signals applied to the elements of the antenna 1024 cause the antenna 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna 1044 and, optionally, a DBF 1042.

Figure 2A:
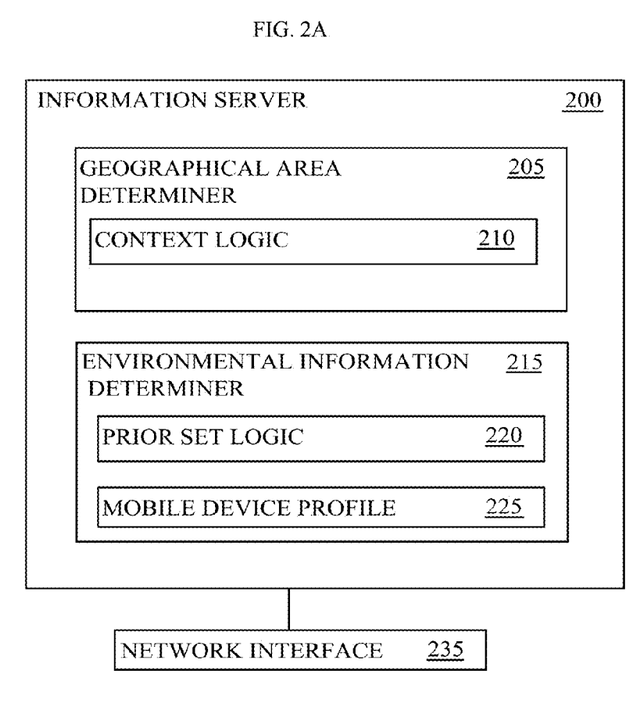
FIG. 2A depicts an embodiment of an apparatus to determine and transmit environmental information.
Figure 2B:
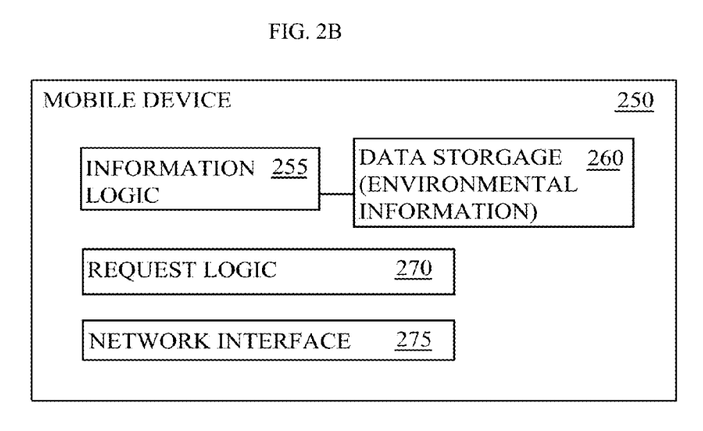
FIG. 2B depicts an embodiment of an apparatus to request and access environmental information.

FIGS. 2A-2B depict embodiments of an information server 200 to determine and transmit environmental information and a mobile device 250 to request and access environmental information. The information server 200 may adaptively determine sets of environmental information to communicate to a communications device such as communications device 250 to minimize or optimize bandwidth usage for communication of the environmental data. More specifically, the information server 200 may determine a set of environmental information for the particular location of the requesting communications device based upon an estimated current location provided by the device. In other words, in many embodiments, the scope of the set of environmental data is determined by the estimated current location and not generically determined based upon a grid. Several embodiments may accomplish this by the geographical area determiner 205 defining a geographical area directly or inherently based upon the estimated current location indicated by the requesting device in the request received from the requesting device.

In some embodiments, additional factors may dynamically affect the position, the size, and the shape of the geographical area such as the direction of movement of the requesting device. To illustrate, the circle 1100 in FIG. 1A may be centered about the estimated current location in some embodiments that do not consider context other than the location. In the present embodiment, the geographical area determiner 205 comprises context logic 210. The context logic 210 may skew the geographical area with respect to the estimated current location based upon context surrounding the request for environmental information. Some context may be related to features in the geographical area such as available roads. Other context may be related to the requesting device such as the direction of movement, speed of movement, a planned route, a movement vector, route constraints, expected location estimation periodicity, granularity of location estimates, etc.

The context logic 210 may skew the geographical area with respect to the estimated current location based upon, e.g., an indication of the direction of movement of the requesting device. In some embodiments, the information server 200 may maintain context such as an indication of the prior location and determine the direction of movement based upon the estimated current location. In further embodiments, the request from the requesting device may include context such as an indication of direction of movement or even preferences with regard to the shape, position, size, and/or default information such as an initial setting for a direction of movement, speed of movement and/or route.

In some embodiments, the context logic 210 may include a prior geographical area for which a prior set of environmental information was transmitted to the requesting device. In such embodiments, the context logic 210 may adjust the current geographical area based upon the estimated current location to remove a portion of the current geographical area that overlaps the prior geographical area. In other embodiments, the context logic 210 facilitates the generation of the current geographical area without overlap of the prior geographical area.

The information server 200 also comprises an environmental information determiner 215. The environmental information determiner 215 may determine a set of environmental information for the current geographical area. The environmental information determiner 215 may access environmental information in memory of the information server such as on a mass storage device or may communicate with another communications device to obtain the environmental information for the geographical area. In one embodiment, the environmental information determiner 215 may receive the environmental information in the form of grid elements and may select a subset of environmental information from one or more grid elements to determine the current set of environmental information to transmit to the requesting device.

The environmental information determiner 215 may comprise a prior set logic 220 and a mobile device profile 225. For embodiments that do not adjust the geographical area based upon the prior geographical area of the prior set, the prior set logic 220 may not include environmental information in the current set if the environmental information was included in a prior set of environmental information transmitted to the requesting device.

The mobile device profile 225 may adjust the current set of environmental information based upon a profile for the requesting device, e.g., received in the request from the requesting device. In further embodiments, mobile device profile 225 may maintain a profile for the requesting device with preferences or parameters associated with the set of environmental information. The mobile device profile 225 may comprise, for instance, one or more preferences related to the types of environmental information the mobile device is capable of using or prefers to use.

FIG. 2B depicts an embodiment of an apparatus, mobile device 250, to request and access environmental information. The mobile device 250 may comprise logic to interact with an information server such as information server 200 for adaptive download and caching of environmental information to support localization. For instance, the mobile device 250 may generate a request including an estimated current location of the mobile device 250 and may transmit the request to the information server to obtain a current set of environmental information. The mobile device 250 may also store at least a portion of a prior set of environmental information, allowing the information server to optimize or minimize bandwidth required to download environmental information to the mobile device 250. More specifically, the mobile device 250 may request a current set of environmental information that would overlap, to some extent, the prior set of environmental information downloaded from the information server. The mobile device 250 may use a combination of the current set of environmental information and the stored set of environmental information in data storage 260 to determine a subsequent location of the mobile device 250 through, e.g., triangulation or multilateration, or fingerprinting.

The mobile device 250 may comprise information logic 255, data storage 260 with environmental information, request logic 270, and a network interface 275. The information logic 255 may store a prior set of environmental information in data storage 260 or at least a portion of the prior set of environmental information that is relevant to the route on which the mobile device 250 is traveling. After receiving a current set of environmental information from the information server, the information logic 255 may store all or part of the current set in the data storage and access the prior set to develop a set of data for determining a subsequent location of the mobile device 250. The mobile device 250 may then determine a location of the mobile device 250 by utilizing the environmental information with methods such as triangulation, multilateration, fingerprinting, or the like, depending upon the capabilities of the mobile device 250 and the type or types of environmental information received from the information server.

The data storage 260 may comprise non-volatile and/or volatile memory. For instance, some embodiments comprise flash memory, hard disk drives, optical storage media, or the like. Some embodiments comprise the data storage 260 with sufficient storage to maintain part of a set of environmental information and some embodiments are capable of storing multiple sets of environmental information.

The request logic 270 may determine a request and the content of the request for environmental information to adapt the environmental information for use by the mobile device 250. The request may include data identifying or indicating a location of the mobile device 250. For instance, the request may include absolute coordinates, coordinates relative to the estimated current location of the mobile device 250, a mix of absolute and relative coordinates (e.g., initial coordinate can be provided as an absolute location, with follow-on coordinate as relative to it), a set of progressively relative coordinates (each location relative to the previous one), or even as a set of values (without coordinates) given that there is a predefined mechanism for the mobile device 250 to decode the transmitted information from the information server. For instance, one such method in the case of a radio map can be "line length" and a set of values for that specific "line" in the map.

The request logic 270 may determine a request comprising identification of the capabilities of the mobile device 250 in terms of being able to sense environmental information about the mobile device 250. For example, the mobile device 250 may be capable of detecting cellular phone signals like beacons from cellular phone towers so the request logic 250 may include data indicating that the mobile device 250 has the capability of detecting cellular phone signals. In further embodiments, the request logic 270 may indicate capabilities to sense environmental information such as energy levels of signals, contents of digital signals, frequencies of signals, light levels, frequencies of changes in light levels, patterns of lights, and/or any other type of signal or signal characteristic that may help identify the location of the mobile device 250 with respect to a source of the signals. In several embodiments, the mobile device 250 may be capable of sensing or determining time based-measurements, tilt or angle measurements, or any other type of measurements that may be useful in estimating a current location based on environmental information.

In many embodiments, a list of capabilities may be developed and the request logic 270 may set a bit to indicate the capability (such as a logical one bit) or reset a bit to indicate that the mobile device 250 does not have a capability (such as a logical zero bit). In other embodiments, the request logic 270 may include or not include elements in the request indicative of certain capabilities. In further embodiments, the request logic 270 may implicitly indicate a capability based upon the method of communication with the information server.

In some embodiments, the request logic 270 may communicate a mobile profile including, for instance, user preferences, to the information server. The request logic 270 may transmit information relating to a planned route for the mobile device 250, data relating to anticipated direction of movement, anticipated rate or speed of movement, preferred geographical areas to define sets of environmental information, preferred types of environmental information, preferred timing or route constraints to define the intervals of requests for sets of environmental information, preferred formats for environmental information, and/or the like. The information server may identify and save one or more of the preferences in a mobile device profile and adjust the size and shape of the geographical area, as well as possibly the type or types of environmental information to include in the current set of environmental information based upon one or more of these parameters. In several embodiments, the request logic 270 may include data related to a third party, navigation server that provides navigation information to the mobile device 250 and the information server may be capable of interfacing directly with the third party navigation server to obtain information about a planned route of the mobile device 250.

The network interface 275 may comprise one or more types of interfaces for one or more types of networks. Many embodiments comprise wireless network interfaces such as Wi-Fi interfaces and/or cellular network interfaces. The network interface 275 may facilitate communication with the information server and, in many embodiments, may function as a sensor for obtaining environmental information proximate to the mobile device 250.

Figure 3A:
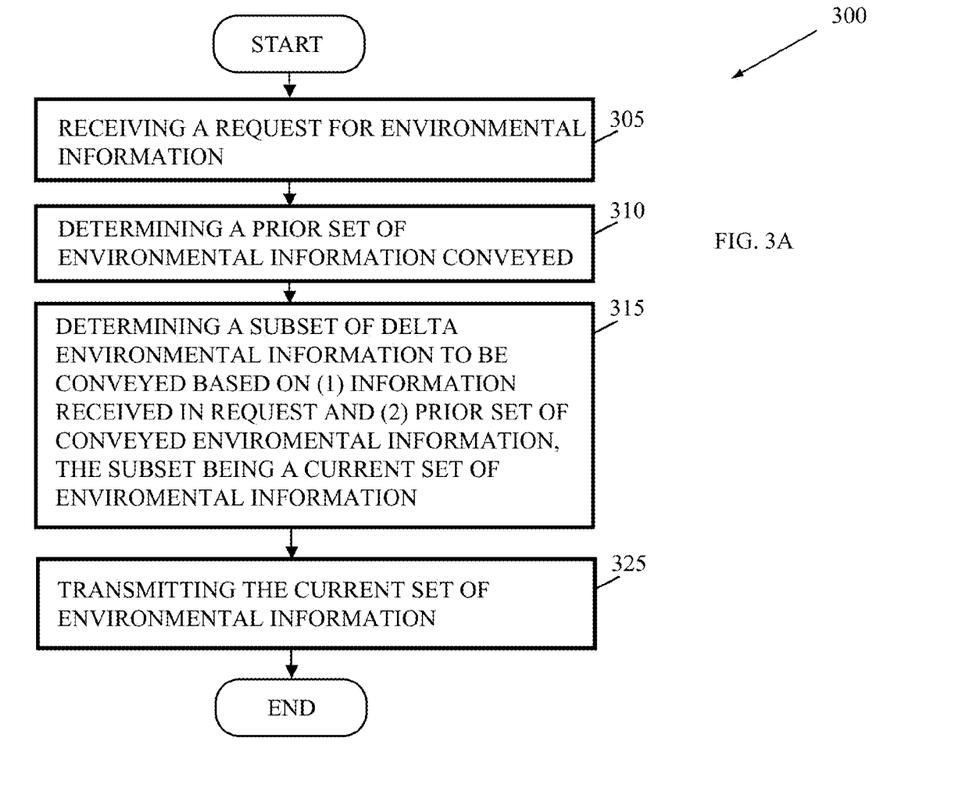
FIGS. 3A-B depict embodiments of flowcharts to determine and transmit environmental information.
Figure 3B:
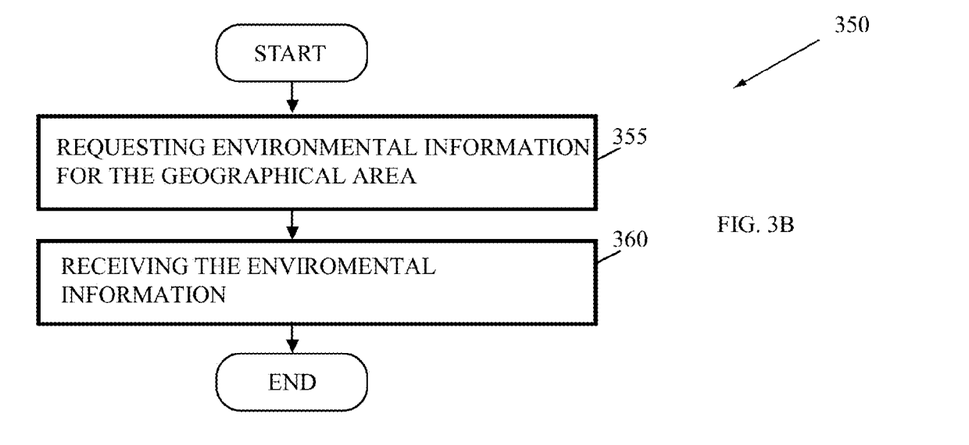

FIGS. 3A-B depict embodiments of flowcharts 300 and 350 to determine and transmit environmental information. Flow chart 300 begins with receiving a request for environmental information (element 305). The information server may receive the request from a mobile device and parse the request to determine the estimated current location of the mobile device. In some embodiments, the information server may parse the request for context related to the provision of environmental information to the mobile device such as capabilities of the mobile device with respect to sensing or detecting environmental information and, in further embodiments, preferences related to the set of environmental information that the mobile device may request. In several embodiments, the request may also include data related to a planned route for movement of the mobile device. And in some embodiments, the request may include data related to one or more prior sets of environmental information that the mobile device may have received and may have stored in data storage accessible to the mobile device.

The information server may determine a prior set of environmental information conveyed to the mobile device (element 310). In some embodiments, the mobile device may provide a preference or capability in a request indicative of the prior set or sets of environmental information that is stored by or otherwise available to the mobile device. In further embodiments, the mobile device may include data related to the prior set or sets of environmental information accessible to the mobile device in a request. The information server may determine this prior set by determining data indicative of the environmental information such as a description of the geographical area of the prior set of environmental information. The information server may then be able to remove or exclude any overlapping environmental information so the same information is not re-transmitted.

The information server may determine a subset of a delta environmental information to be conveyed to the mobile device based upon information received in the request from the mobile device and the prior set of environmental information conveyed to the mobile device, the subset being the current set of environmental information (element 315). The request may include information such as the estimated current location or relative location of the mobile device, a movement vector, a maximum speed, expected required granularity of location estimates, expected location estimation periodicity, etc. Many embodiments may also take into consideration geographical, topological, and/or other physical layout information related to the area proximate to the mobile device as well as the availability of and usefulness of environmental information in the vicinity of the mobile device. Some embodiments may further account for the affects of weather, traffic, or other conditions that may affect the usefulness of environmental information in the vicinity of the mobile device.

In many embodiments, the information server may gather the environmental information for the current set of environmental information about the estimated current location of the device, determining the geographical area and the current set of environmental information concurrently. In some of these embodiments, the environmental information gathered may not include environmental information conveyed to the mobile device in a prior set of environmental information.

In some embodiments, the information server may determine a geographical area directly or inherently for which to provide the mobile device environmental information based upon an estimated current location of the mobile device. In several embodiments, the information server may determine the geographical area by a default setting such as a default size or a default amount of environmental information to transmit to the mobile device and, in some embodiments, the information server may also take into account capabilities and/or preferences provided by the mobile device to the information server. For example, when the mobile device is following a planned route, the information server may determine a geographical area along the route rather than a geographical area of, e.g., some geometric shape. In several embodiments, the geographical area will overlap a geographical area of a prior set of environmental information transmitted to the mobile device. In such embodiments, the information server may receive in the request or store in a local data storage, an indication of the geographical area of the prior set of environmental information so the overlapping area of the geographical area determined for the current set of environmental information can be excluded from the geographical area of the prior set of environmental information. In other embodiments, the repetitive environmental information may be removed or excluded from the current set of environmental information prepared for the mobile device.

In several embodiments, the information server may determine the current set of environmental information based upon the geographical area in a manner that removes or excludes the environmental information provided in the prior set of environmental information transmitted to the mobile device. For instance, in cases in which the geographical area is designed to avoid an overlapping area, the environmental information may be determined for the geographical area either from local sources of environmental information or from remote sources of environmental information.

Referring also to FIG. 3B, the flow chart 350 describes actions performed by an information server to gather environmental information from a third party environmental information repository. In particular, the information server may request the environmental information for the geographical area determined for the current set of environmental information (element 355) and the information server may receive, from the repository, environmental information covering the area. In some embodiments, the information server may request and receive environmental information designed for the geographical area. In other embodiments, the information may request and receive environmental information that may exceed the boundaries of the geographical area. In such embodiments, the information server may reduce the environmental information down to the environmental information to send to the mobile device in the current set of environmental information requested by the mobile device.

The information server may then transmit the current set of environmental information to the mobile device (element 325). In some embodiments, the information server may directly communicate with the mobile device. In other embodiments, the information server may be communicating with the mobile device through a number of servers, a base station and/or an access point. For example, the mobile device may be in a shopping mall and may access the shopping mall's access point and server to request the current set of environmental information from a developer's Internet web site. The information server may transmit the current set of environmental information through a wired connection to the Internet, the current set may pass through a number of servers and routers to arrive at the shopping mall's server and the shopping mall's server may direct the current set through the access point to the mobile device.

Figure 4:
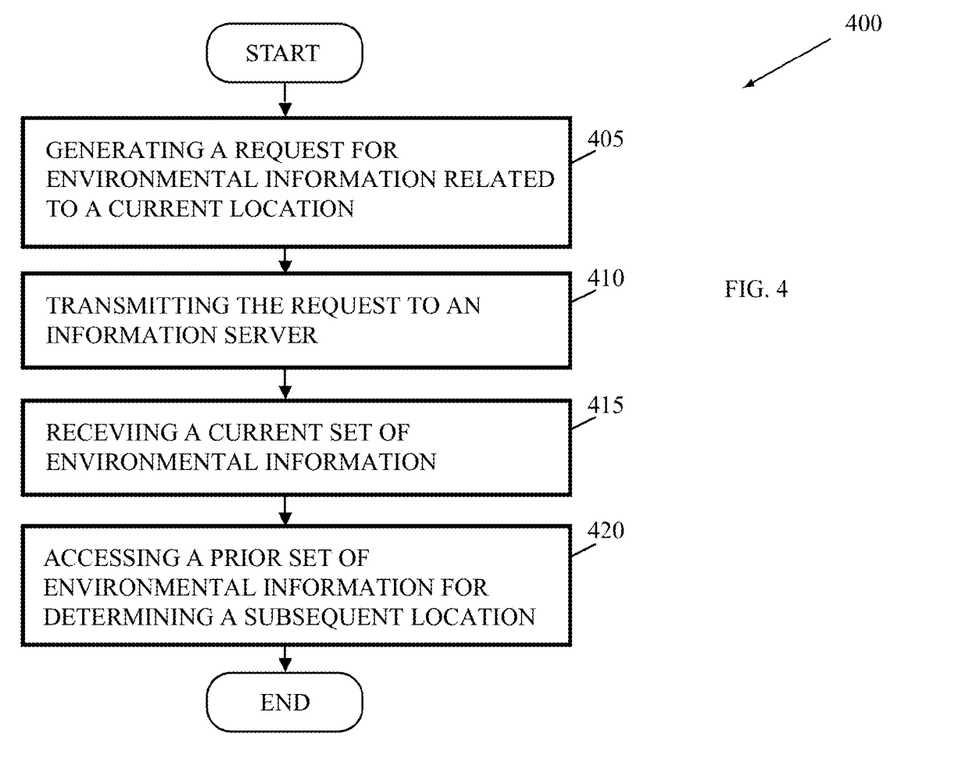
FIG. 4 depicts an embodiment of a flowchart to request and access environmental information.

FIG. 4 depicts an embodiment of a flowchart 400 to request and access environmental information. The flow chart 400 begins with generating the current request, wherein the current request comprises data indicating that the communications device will retain at least a portion of the prior set of environmental information and that the communications device requests the current set of environmental information excludes environmental information in the prior set of environmental information (element 405). The communications device may then transmit the current request for a current set of environmental information, the request comprising an estimated current location (element 410) and receive the current set of environmental information, wherein the current set of environmental information comprises environmental information in a current geographical area excluding environmental information received in a prior set of environmental information (element 415).

After receiving the current set of environmental information, the communications device may access at least a portion of the prior set of environmental information and the current set of environmental information to determine a second location (element 420). For instance, the communications device may utilize both the current and prior sets of environmental information to determine the location of the communications device once the communications device reaches a route constraint or a certain distance from the first location for the purposes of generating a subsequent request for another set of environmental information.

The following examples pertain to further embodiments. One example comprises a method. The method may involve receiving, by an information server via a wireless receiver, an estimated current location of a device, wherein the location is part of a request by the device to transmit, to the device, a current set of environmental information, wherein the environmental information comprises information for locating the device; determining, by the information server, a prior set of environmental information conveyed to the device; determining, by the information server, in response to receiving the estimated current location, a geographical area for which to determine the current set of environmental information based upon the estimated current location; determining, by the information server, the current set of environmental information based upon the estimated current location and based upon the prior set of environmental information, wherein the current set of environmental information excludes environmental information in the prior set of environmental information conveyed to the device; and transmitting, by the information server via a wireless transmitter, the current set of environmental information to the device.

In some embodiments, receiving the estimated current location of the device comprises receiving data indicative of a relative location with respect to a prior location or an absolute location. Determining a prior set of environmental information conveyed to the device may comprise receiving an indication of the prior set of environmental information from the device. In further embodiments, determining a prior set of environmental information conveyed to the device comprises maintaining an indication of the prior set of environmental information from the device in memory. In some embodiments, determining the geographical area comprises determining the geographical area based upon context in addition to the estimated current location, wherein determining the geographical area based upon context comprises determining the geographical are based upon a direction of movement of the device. In some embodiments, determining the geographical area based upon context comprises determining the geographical are based upon a route associated with movement of the device. In some embodiments, determining the current set of environmental information comprises determining the current set of environmental information based upon the geographical area, wherein the geographical area excludes a prior geographical area associated with the prior set of environmental information. In some embodiments of the method, determining the current set of environmental information comprises determining the current set of environmental information based upon the geographical area and removing environmental information included in the prior set of environmental information.

At least one computer program product for communication of a packet with a short frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a network interface to receive a request from a device to transmit, to the device, a current set of environmental information, wherein the environmental information comprises information for locating the device and to transmit the current set of environmental information to the device; and an information server coupled with the network interface to determine a prior set of environmental information conveyed to the device; to determine, in response to receiving the estimated current location, a geographical area for which to determine the current set of environmental information based upon the estimated current location; and to determine the current set of environmental information based upon the estimated current location and based upon the prior set of environmental information, wherein the current set of environmental information excludes environmental information in the prior set of environmental information conveyed to the device.

In some embodiments, the information server comprises logic to determine the prior set of environmental information conveyed to the device from an indication of the prior set of environmental information in the request from the device. In some embodiments, the information server comprises logic to determine the prior set of environmental information conveyed to the device by accessing an indication of the prior set of environmental information maintained in memory. In further embodiments, the information server comprises logic to determine the geographical area based upon context in addition to the estimated current location. In some embodiments, the information server comprises logic to determine the current set of environmental information based upon the geographical area, wherein the geographical area excludes a prior geographical area associated with the prior set of environmental information. In some embodiments, the information server comprises logic to determine the current set of environmental information based upon the geographical area and removing environmental information included in the prior set of environmental information.

Another example comprises a system. The system may comprise at least one system comprising the apparatus according to any one or more of or all of the elements above and comprising an antenna coupled with the physical layer logic to transmit the frame. The system may further comprise memory to store at least part of the frame.

The following examples pertain to further embodiments. One example comprises a method. The method may involve transmitting, by a communications device, a current request for a current set of environmental information, the request comprising an estimated current location; receiving, by the communications device, the current set of environmental information, wherein the current set of environmental information comprises environmental information in a current geographical area excluding environmental information received in a prior set of environmental information; and accessing, by the communications device, at least a portion of the prior set of environmental information and the current set of environmental information to determine a second location.

In some embodiments, the method may further comprise generating the current request, wherein the current request comprises data indicating that the communications device will retain at least a portion of the prior set of environmental information and that the communications device requests the current set of environmental information excludes environmental information in the prior set of environmental information. In some embodiments, the method may further comprise generating the current request, wherein the current request comprises data indicating that the current set of environmental information comprise environmental information in the prior set of environmental information. In some embodiments, the method may further comprise generating the current request, wherein the current request comprises data indicating that the current set of environmental information comprise environmental information along a planned route. In some embodiments, the method may further comprise generating the current request, wherein the current request comprises data indicating that the current set of environmental information comprise environmental information based upon a speed of movement of the communications device.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a request logic to generate a current request for a current set of environmental information, the request comprising an estimated current location; a transmitter to transmit the current request; a receiver to receive the current set of environmental information, wherein the current set of environmental information comprises environmental information in a current geographical area excluding environmental information received in a prior set of environmental information; a memory to store at least a portion of the prior set of environmental information and the current set of environmental information; and information logic to access the at least a portion of the prior set of environmental information and the current set of environmental information to determine a second location.

In some embodiments, the request logic comprises logic to generate the current request, wherein the current request comprises data indicating that the communications device will retain at least a portion of the prior set of environmental information and that the communications device requests the current set of environmental information excludes environmental information in the prior set of environmental information. In some embodiments, the request logic comprises logic to generate the current request, wherein the current request comprises data indicating that the current set of environmental information comprise environmental information along a planned route. In further embodiments, the request logic comprises logic to the current request, wherein the current request comprises data indicating that the current set of environmental information comprise environmental information based upon a direction of movement of the communications device.

Another example comprises a system. The system may comprise at least one system comprising the apparatus according to any one or more of or all of the elements above and comprising an antenna coupled with the physical layer logic to transmit the frame. The system may further comprise memory to store at least part of the frame. In some embodiments, the system may further comprise memory to store at least part of the frame.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, a one-time programmable (OTP) memory, e-fuse, or the like. A user may select still further features after deployment via a selectable preference such as a software preference, a one-time programmable (OTP) memory, a dipswitch, or the like.

Another embodiment may comprise a computer program product to communicate environmental information supporting localization, the computer program product comprising: a computer useable medium having a computer useable program code embodied therewith, the computer useable program code comprising computer useable program code configured to perform operations, the operations comprising: receiving, by an information server, an estimated current location of a device, wherein the location is part of a request by the device to transmit, to the device, a current set of environmental information, wherein the environmental information comprises information for locating the device; determining, by the information server, a prior set of environmental information conveyed to the device; determining, by the information server, in response to receiving the estimated current location, a geographical area for which to determine the current set of environmental information based upon the estimated current location; determining, by the information server, the current set of environmental information based upon the estimated current location and based upon the prior set of environmental information, wherein the current set of environmental information excludes environmental information in the prior set of environmental information conveyed to the device; and transmitting, by the information server, the current set of environmental information to the device.

In some embodiments, determining the geographical area comprises determining the geographical area based upon context in addition to the estimated current location, wherein determining the geographical area based upon context comprises determining the geographical are based upon a direction of movement of the device. In some embodiments, determining the geographical area comprises determining the geographical area based upon context in addition to the estimated current location, wherein determining the geographical area based upon context comprises determining the geographical are based upon a route associated with movement of the device.

Another embodiment may comprise a computer program product for obtaining environmental information supporting localization, the computer program product comprising: a computer useable medium having a computer useable program code embodied therewith, the computer useable program code comprising computer useable program code configured to perform operations, the operations comprising: transmitting a current request for a current set of environmental information, the request comprising an estimated current location; receiving the current set of environmental information, wherein the current set of environmental information comprises environmental information in a current geographical area excluding environmental information received in a prior set of environmental information; and accessing at least a portion of the prior set of environmental information and the current set of environmental information to determine a second location.

Some embodiments may further comprise generating the current request, wherein the current request comprises data indicating that the communications device will retain at least a portion of the prior set of environmental information and that the communications device requests the current set of environmental information excludes environmental information in the prior set of environmental information. Some embodiments may further comprise generating the current request, wherein the current request comprises data indicating that the current set of environmental information comprise environmental information along a planned route. Some embodiments may further comprise generating the current request, wherein the current request comprises data indicating that the current set of environmental information comprise environmental information based upon a direction of movement of the communications device.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, WiGig, Bluetooth™, Ethernet, Wi-Fi, and WiDi adapter cards are just a few of the currently available types of network adapters.

What is claimed is:

1. A method comprising:
receiving, by an information server via a wireless receiver, an estimated current location of a device, wherein the location is part of a request by the device to transmit, to the device, a current set of environmental information, wherein the environmental information comprises information for locating the device;
determining, by the information server, a prior set of environmental information conveyed to the device;
determining, by the information server, in response to receiving the estimated current location, the current set of environmental information based upon the estimated current location and based upon the prior set of environmental information, wherein the current set of environmental information is a subset of delta environmental information that excludes environmental information in the prior set of environmental information conveyed to the device; and transmitting, by the information server via a wireless transmitter, the current set of environmental information to the device.

2. The method of claim 1, wherein receiving the estimated current location of the device comprises receiving data indicative of a relative location with respect to a prior location or an absolute location.

3. The method of claim 1, wherein determining a prior set of environmental information conveyed to the device comprises receiving an indication of the prior set of environmental information from the device.

4. The method of claim 1, wherein determining a prior set of environmental information conveyed to the device comprises maintaining an indication of the prior set of environmental information from the device in memory.

5. The method of claim 1, wherein determining the current set of environmental information comprises determining a geographical area directly or inherently based upon context in addition to the estimated current location, wherein determining the geographical area based upon context comprises determining the geographical area based upon a direction of movement of the device.

6. The method of claim 5, wherein determining the geographical area based upon context comprises determining the geographical are based upon a route associated with movement of the device.

7. The method of claim 1, wherein determining the current set of environmental information comprises determining the current set of environmental information based upon a geographical area, wherein the geographical area excludes a prior geographical area associated with the prior set of environmental information.

8. The method of claim 1, wherein determining the current set of environmental information comprises determining the current set of environmental information based upon a geographical area and removing environmental information included in the prior set of environmental information.

9. An apparatus comprising:
   a network interface to receive a request from a device to transmit, to the device, a current set of environmental information, wherein the environmental information comprises information for locating the device and to transmit the current set of environmental information to the device; and
   an information server coupled with the network interface to determine a prior set of environmental information conveyed to the device; to determine, in response to receiving the estimated current location; and to determine the current set of environmental information based upon the estimated current location and based upon the prior set of environmental information, wherein the current set of environmental information excludes environmental information in the prior set of environmental information conveyed to the device.

10. The apparatus of claim 9, wherein the information server comprises logic to determine the prior set of environmental information conveyed to the device from an indication of the prior set of environmental information in the request from the device.

11. The apparatus of claim 9, wherein the information server comprises logic to determine the prior set of environmental information conveyed to the device by accessing an indication of the prior set of environmental information maintained in memory.

12. The apparatus of claim 9, wherein the information server comprises logic to determine a geographical area based upon context in addition to the estimated current location.

13. The apparatus of claim 9, wherein the information server comprises logic to determine the current set of environmental information based upon a geographical area, wherein the geographical area excludes a prior geographical area associated with the prior set of environmental information.

14. The apparatus of claim 9, wherein determining the current set of environmental information comprises determining the current set of environmental information based upon a geographical area and removing environmental information included in the prior set of environmental information.

15. A method comprising:
   transmitting, by a communications device, a current request for a current set of environmental information, the request comprising an estimated current location;
   receiving, by the communications device, the current set of environmental information, wherein the current set of environmental information comprises environmental information in a current geographical area excluding environmental information received in a prior set of environmental information; and
   accessing, by the communications device, at least a portion of the prior set of environmental information and the current set of environmental information to determine a second location.

16. The method of claim 15, further comprising generating the current request, wherein the current request comprises data indicating that the communications device will retain at least a portion of the prior set of environmental information and that the communications device requests the current set of environmental information excludes environmental information in the prior set of environmental information.

17. The method of claim 15, further comprising generating the current request, wherein the current request comprises data indicating that the current set of environmental information comprise environmental information in the prior set of environmental information.

18. The method of claim 17, further comprising generating the current request, wherein the current request comprises data indicating that the current set of environmental information comprise environmental information along a planned route.

19. The method of claim 17, further comprising generating the current request, wherein the current request comprises data indicating that the current set of environmental information comprise environmental information based upon a speed of movement of the communications device.

20. An apparatus comprising:
   a request logic to generate a current request for a current set of environmental information, the request comprising an estimated current location;
   a transmitter to transmit the current request;
   a receiver to receive the current set of environmental information, wherein the current set of environmental information comprises environmental information in a current geographical area excluding environmental information received in a prior set of environmental information;
   a memory to store at least a portion of the prior set of environmental information and the current set of environmental information; and information logic to access the at least a portion of the prior set of environmental information and the current set of environmental information to determine a second location.

21. The apparatus of claim 20, wherein the request logic comprises logic to generate the current request, wherein the current request comprises data indicating that the communications device will retain at least a portion of the prior set of environmental information and that the communications device requests the current set of environmental information excludes environmental information in the prior set of environmental information.

22. The apparatus of claim 20, wherein the request logic comprises logic to generate the current request, wherein the current request comprises data indicating that the current set of environmental information comprise environmental information along a planned route.

23. The apparatus of claim 20, wherein the request logic comprises logic to the current request, wherein the current request comprises data indicating that the current set of environmental information comprise environmental information based upon a direction of movement of the communications device.

24. A computer program product to communicate environmental information supporting localization, the computer program product comprising:
 a non-transitory computer useable medium having a computer useable program code embodied therewith, the computer useable program code comprising computer useable program code configured to perform operations, the operations comprising:
 receiving, by an information server, an estimated current location of a device, wherein the location is part of a request by the device to transmit, to the device, a current set of environmental information, wherein the environmental information comprises information for locating the device;
 determining, by the information server, a prior set of environmental information conveyed to the device;
 determining, by the information server, in response to receiving the estimated current location, the current set of environmental information based upon the estimated current location and based upon the prior set of environmental information, wherein the current set of environmental information is a subset of delta environmental information that excludes environmental information in the prior set of environmental information conveyed to the device; and
 transmitting, by the information server, the current set of environmental information to the device.

25. The computer program product of claim 24, wherein determining the current set of environmental information comprises determining a geographical area directly or inherently based upon context in addition to the estimated current location, wherein determining the geographical area based upon context comprises determining the geographical are based upon a direction of movement of the device.

26. The computer program product of claim 24, wherein determining the current set of environmental information comprises determining a geographical area directly or inherently based upon context in addition to the estimated current location, wherein determining the geographical area based upon context comprises determining the geographical area based upon a route associated with movement of the device.

27. A computer program product for obtaining environmental information supporting localization, the computer program product comprising:
 a non-transitory computer useable medium having a computer useable program code embodied therewith, the computer useable program code comprising computer useable program code configured to perform operations, the operations comprising:
 transmitting a current request for a current set of environmental information, the request comprising an estimated current location;
 receiving the current set of environmental information, wherein the current set of environmental information comprises environmental information in a current geographical area excluding environmental information received in a prior set of environmental information; and
 accessing at least a portion of the prior set of environmental information and the current set of environmental information to determine a second location.

28. The computer program product of claim 27, further comprising generating the current request, wherein the current request comprises data indicating that the communications device will retain at least a portion of the prior set of environmental information and that the communications device requests the current set of environmental information excludes environmental information in the prior set of environmental information.

29. The computer program product of claim 27, further comprising generating the current request, wherein the current request comprises data indicating that the current set of environmental information comprise environmental information along a planned route.

30. The computer program product of claim 27, further comprising generating the current request, wherein the current request comprises data indicating that the current set of environmental information comprise environmental information based upon a direction of movement of the communications device.

* * * * *